US005598674A

United States Patent [19]
Lay et al.

[11] Patent Number: 5,598,674
[45] Date of Patent: Feb. 4, 1997

[54] GLASS COMPOSITE PANEL

[76] Inventors: Randy W. Lay, 1204 Churchill Dr., Irving, Tex. 75060; Beth K. Cunningham, 2403 Hillside Ct., Southlake, Tex. 76092

[21] Appl. No.: 467,562

[22] Filed: Jun. 6, 1995

[51] Int. Cl.$^6$ .................................................. E04C 1/00
[52] U.S. Cl. ...................... 52/309.1; 52/788.1; 52/783.1; 428/432; 428/461; 428/469
[58] Field of Search ................................ 52/309.1, 309.5, 52/783.1, 788.1, 784.1, 796.1; 428/432, 461, 462

[56] References Cited

U.S. PATENT DOCUMENTS

| | | | |
|---|---|---|---|
| 4,587,784 | 5/1986 | Chavy et al. | 52/788.1 X |
| 4,692,744 | 9/1987 | Hickman | 52/788.1 X |
| 5,518,182 | 4/1996 | Ehrat et al. | 52/783.1 X |

*Primary Examiner*—Creighton Smith
*Attorney, Agent, or Firm*—Winstead Sechrest & Minick, L.P.

[57] ABSTRACT

There is disclosed a lightweight composite glass panel constructed of a tempered glass pane mounted on a supporting panel with a layer of PVC laminate. The supporting panel includes two layers of aluminum sheeting with a polyethylene core. The composite glass panel may be mounted on walls or other structures using keyholes cut through the rear aluminum panel and into the polyethylene core or by edge brackets that insert into a groove routered into the polyethylene core around the edges of the panel.

9 Claims, 2 Drawing Sheets

5,598,674

GLASS COMPOSITE PANEL

TECHNICAL FIELD OF THE INVENTION

This invention relates to a multilayer structural panel for internal and external building applications, and in particular to a composite panel consisting of a glass pane bonded to a lightweight, high strength backing panel comprised of two metal layers separated by a lightweight, porous core.

BACKGROUND OF THE INVENTION

Multilayer structural materials employing an outer layer of glass are a popular structural material. The inner face of the glass pane is quite often painted or the glass tinted in order to give the glass panel a desired appearance, including polished marble, mosaic tiles, engraved metal, etc.

Glass composite panels are used in a variety of architectural applications, both internally and externally to the structure. Glass composite panels may be used on walls to form shower/bathtub enclosures, on walls in elevator cabs, or on external walls as spandrels, which cover the gaps between floors on the exterior of office buildings that have glass exteriors.

There are numerous composite structural materials known in the prior art, including many made from plastics and metal. However all of the glass composite panel structures in the prior art exhibit one drawback or another, including excessive weight, high manufacturing costs, or the need for mounting brackets that clamp around the edge of the glass composite panel and which are therefore visible from the outside.

There is therefore a need for a multilayer glass composite panel that is light in weight, yet strong and resistant to shock.

There is a further need for a glass composite panel that is simple and inexpensive to fabricate.

There is a still further need for a glass composite panel that may be mounted to a wall or other structure by mounting brackets that are not visible on the exterior of the glass composite panels and which may be attached to the panels in a variety of ways.

SUMMARY OF THE INVENTION

The present invention overcomes the limitations inherent in the prior art by providing a multilayer structural panel comprising an outer layer of glass mounted on a supporting panel comprised of two thin layers of aluminum sheeting separated by a lightweight core, such as polyethylene, styrofoam, cell aluminum, or fiberglass. The pane of glass is mounted on the supporting panel by a colored or transparent layer of adhesive, such as PVC laminate.

The present invention is easily mountable to walls by means of keyholes drilled into the back layer of the aluminum sheeting, thereby allowing the keyholes to be positioned over mounting bolts affixed to a permanent surface behind the glass panel. The glass composite panels of the present invention are also easily mountable to walls or other structures by means of a groove routered in the lightweight core around the edge of the panel.

The present invention also provides a more effective means of mounting the glass on the supporting panel by first mounting the outward facing aluminum layer on the glass pane before mounting the polyethylene core and the rear aluminum layer to the outward facing aluminum layer. This method of fabrication prevents heat-stress damage to the polyethylene core that may be incurred when the PVC laminate is heated in order to mount the glass pane to the outward facing aluminum layer.

The present invention also advantageously allows the outward facing aluminum layer to be painted with a desired pattern, such as polished marble, mosaic tile, etc. before being mounted to the glass pane. It is this painted surface that a viewer sees when looking at the composite panel.

The foregoing has outlined rather broadly the features and technical advantages of the present invention in order that the detailed description of the glass composite panel that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
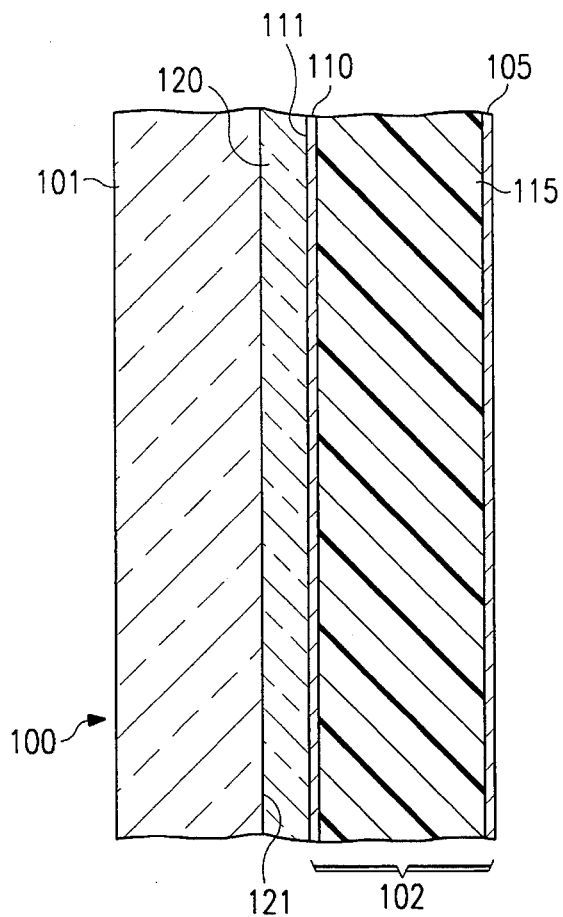
FIG. 1 is a cross-sectional view of a composite glass panel in accordance with the present invention.

FIG. 1 depicts a cross-sectional view of glass composite panel 100 in accordance with the present invention. In a preferred embodiment, tempered (or heat strengthened) glass pane 101 is bonded to supporting panel 102 by means of a clear or colored laminate, such as a layer of polyvinyl chloride (PVC) 120. Supporting panel 102 is comprised of two thin layers of metal, 105 and 110, separated by a lightweight core 115.

In a preferred embodiment of the present invention, rear metal panel 105 and front metal panel 110 are comprised of aluminum, and lightweight core 115 is comprised of polyethylene. This combination provides a thin, lightweight panel that is nonetheless rigid and strong. In other embodiments where greater strength is required and a thicker supporting panel 102 may be used, lightweight core 125 may be made of honeycomb, cell-aluminum, styrofoam, fiberglass, etc.

Outer surface 111 of front aluminum panel 110 is visible through tempered glass pane 101 and PVC laminate 120. For aesthetic purposes, outer surface 111 of front aluminum panel 110 is usually painted with a desired finishing design, such as polished marble, mosaic tiles, polished or engraved metal, or any one of innumerable other patterns.

In other embodiments of the present invention, PVC laminate 120 may be replaced by an opaque adhesive layer. However, in such an embodiment, a desired finishing design must be painted on inner surface 121 of tempered glass pane 101, since outer surface 111 of front aluminum panel 110 will no longer be visible.

Glass composite panel 100 may be fabricated in numerous ways. In one embodiment of the present invention, supporting panel 102 is first formed by sandwiching polyethylene core 115 between rear aluminum panel 105 and front aluminum panel 110. Glass pane 101 is then bonded to supporting panel 102 using PVC laminate 120. However, this method may cause some heat stress damage to the polyethylene core as a result of heating supporting panel 102, glass pane 101 and the PVC laminate 120 in an oven during the PVC bonding process.

Therefore, in a preferred embodiment of the present invention, front aluminum panel 110 is first mounted to glass pane 101 using PVC laminate 120. After the PVC laminate 120 has cooled, polyethylene core 115 and rear aluminum panel 105 are mounted on front aluminum panel 110, to thereby form glass composite panel 100 of the present invention.

In any fabrication process, outer surface 111 of front aluminum panel 110 is first painted (or constructed) with the desired pattern.

Glass pane 101 varies in thickness from ⅛" to 1" depending on the application for which the glass is to be used. Thinner glass and a thinner supporting panel 102 are used in applications where weight is critical. Front aluminum panel 110 and rear aluminum panel 105 vary in thickness from 0.01" to 0.09", depending on the weight of the glass pane and the anticipated stress that will be placed on glass composite panel 100. Polyethylene core 115 also varies in thickness from 0.04" to 2", as required. PVC laminate is typically less than 0.3" thick.

For example, a typical glass composite panel 100 used as a bathroom enclosure panel, an elevator finishing panel, or architectural panel is comprised of ⅛" thick glass, a 1/16" PVC laminate, and a supporting panel 102 at least ⅛" thick. If greater strength is needed, supporting panel 102 may be increased up to about 2" thick, and honeycomb may be used instead of polyethylene at the greater thicknesses.

Figure 2:
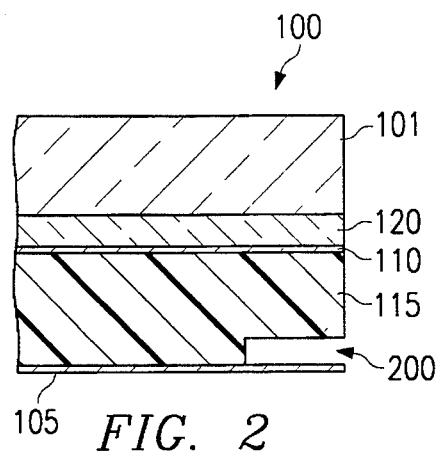
FIG. 2 is a cross-sectional view of the present invention with grooves routered into the panel for attachment of mounting fixtures.

FIG. 2 is a cross-sectional view of glass composite panel 100 that is similar to the cross-sectional view in FIG. 1. However, in FIG. 2, a groove 200 has been routered into polyethylene core 115 around the edge of glass composite panel 100. Groove 200 is used in conjunction with a mounting bracket to attach glass composite panel 100 to walls and other structures.

Although FIG. 2 shows rear aluminum panel 105 flush with the ends of glass pane 101, PVC laminate 120, front aluminum panel 110 and polyethylene core 115, rear aluminum panel 105 may be cut shorter than the rest of glass composite panel 100 in order to allow a mounting bracket (not shown) to clamp into groove 200 from the back of the panel, without extending beyond the edges of glass composite panel 100. This would allow adjacent glass composite panels to be mounted flush to one another with no gap between the panels. A typical bracket would be positioned along the entire length of the panel and would be in an "L" shape with the base of the "L" extending into groove 200.

Figure 3:
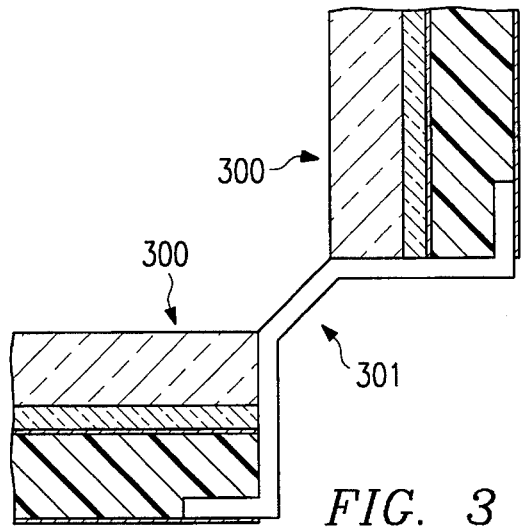
FIG. 3 is a top view of two composite glass panels in accordance with the present invention used to form an inside corner.

FIG. 3 shows two glass composite panels 300 similar to glass composite panel 100 used to form an inside corner in conjunction with bracket 301. Although bracket 301 has a center portion which provides a corner beveled at 45° to either wall, the center portion of bracket 301 may be omitted so that the two glass composite panels are flush to one another and form a 90° corner.

Figure 4:
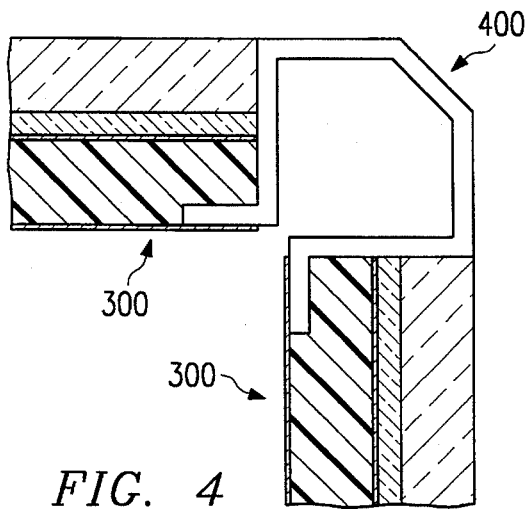
FIG. 4 is a top view of two composite glass panels in accordance with the present invention used to form an outside corner.

FIG. 4 shows two glass composite panels 300 similar to glass composite panel 100 used in conjunction with bracket 400 to form an outside corner. In FIGS. 3 and 4, bracket 301 and bracket 400 utilize groove 200 in each glass composite panel 300 in order to attach to the panel. The attachment of the bracket to the panel can be by friction or can be cemented (bonded) into place. The brackets could be fashioned from flexible material (spring steel, plastic) so as to be forced into place and, if desired, removable from the front.

Figure 5:
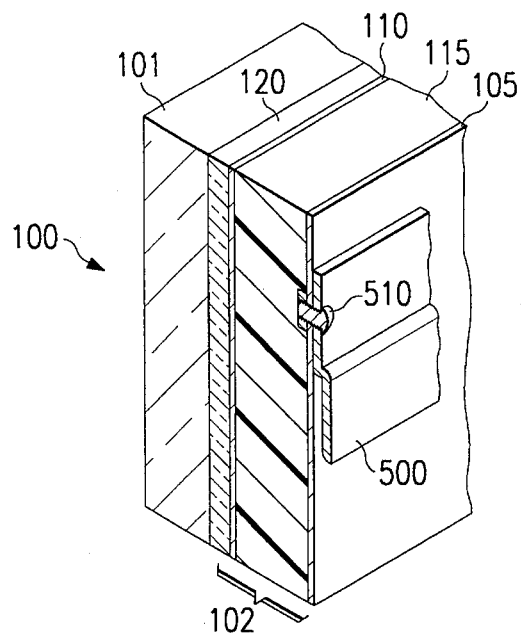
FIG. 5 is a perspective view of the present invention with a mounting bracket attached thereto.

FIG. 5 depicts a perspective view of glass composite panel 100 wherein a mounting bracket 500 is connected to the back of glass composite panel 100 by any means, such as bolt 510. Bracket 500, due to its cross-sectional shape, is often referred to as a "Z-bracket". As FIG. 5 shows, Z-bracket 500 can be mounted at any location on the back of composite glass panel 100, so that Z-bracket 500 is not visible from the outside.

Figure 6:
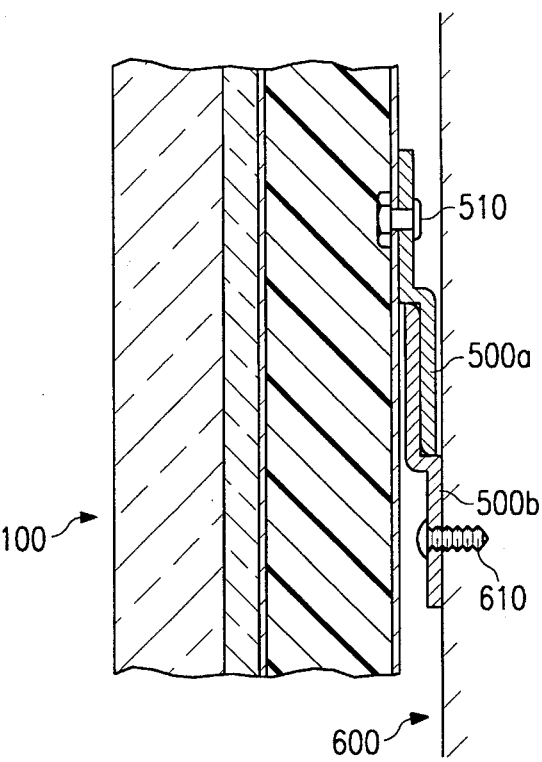
FIG. 6 is a cross-sectional view of the present invention mounted on a wall.

FIG. 6 shows glass composite panel 100 mounted on wall 600 by means of two Z-brackets 500a and 500b. A first Z-bracket 500a is mounted to glass composite panel 100 by means of bolt 510 and a second inverted Z-bracket 500b is mounted to wall 600 by any means, such as screw 610. Glass composite panel 100 is mounted to wall 600 by dropping Z-bracket 500a down into the gap between inverted Z-bracket 500b and wall 600.

Figure 7:
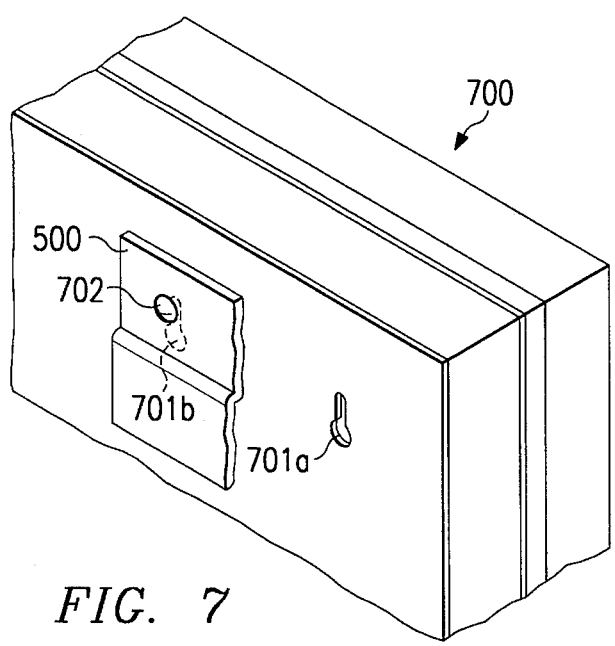
FIG. 7 is a perspective view of the back surface of the present invention depicting an installed mounting bracket and a mounting keyhole.

FIG. 7 shows a view of the back of glass composite glass panel 700, which is the same as panel 100 except keyhole 701a and keyhole 701b have been cut into rear aluminum panel 105. Z-bracket 500 is shown mounted to the back of glass composite panel 700 using bolt 702 (mounted in Z-bracket 500), which has been inserted into keyhole 701b and pushed upward to thereby maintain a tight friction grip between rear aluminum panel 105 and Z-bracket 500.

In a preferred embodiment, glass composite panel 100 is constructed with precut holes (not shown) for specified applications, due to the difficulty in cutting tempered glass. For example, if composite glass panel 100 is to be used to construct a shower or bathtub enclosure, holes are precut for plumbing fixtures to pass through the panel. This will generally not be a drawback since flexible plumbing fixtures are now commonly used.

Additionally, a plurality of mounting holes may optionally be precut in rear aluminum panel 105 and groove 200 may be routered into polyethylene core 115 at the factory for standard mounting applications, although neither is necessary since the aluminum and the polyethylene are both easy to cut/machine.

Furthermore, in a preferred embodiment, mounting bolts 510 and 702 used to mount composite glass panel 100 are similar to a two piece threaded bolt, popularly known as a "sex bolt". The female portion of the bolt contains a hollow cylindrical shaft with threading on the interior surface of the shaft. The male portion of the bolt contains a solid cylindrical shaft with threading on the exterior of the shaft. Composite glass panel 100 may be fabricated with the head of the female portion positioned in the polyethylene layer and with the shaft of the female portion projecting outward though a precut hole or a slot in rear aluminum panel 105. The panel may then be easily attached to a bracket or a wall fixture by simply screwing the male portion of the bolt into the female portion.

Although the present invention and its advantages have been described in detail, it should be understood that various changes, substitutions and alterations can be made herein without departing from the spirit and scope of the invention as defined by the appended claims.

What is claimed is:

1. A multilayer structural panel comprising:

a glass layer;

a transparent adhesive layer comprised of polyvinyl chloride; and a supporting layer attached to said glass layer by said adhesive layer, said supporting layer comprised of a first layer and a second layer of relatively thin structural support material separated by a relatively lightweight core layer.

2. The multilayer structural panel as set forth in claim 1 wherein an edge of said core layer contains a groove for mounting said structural panel.

3. The multilayer structural panel as set forth in claim 1 wherein said first layer of structural support material abuts said adhesive layer and wherein mounting slots are formed in said second layer.

4. A multilayer structural panel comprising:

a glass layer;

a supporting layer comprised of a first aluminum layer and a second aluminum layer separated by a relatively lightweight core layer comprised of polyethylene; and an adhesive layer comprised of polyvinyl chloride for mounting said glass layer to said first aluminum layer.

5. The multilayer structural panel as set forth in claim 4 wherein said glass layer is comprised of tempered glass.

6. The multilayer structural panel as set forth in claim 4 wherein said adhesive layer is transparent.

7. The multilayer structural panel as set forth in claim 4 wherein said polyethylene core layer has a thickness greater than a thickness of said first aluminum layer or said second aluminum layer.

8. The multilayer structural panel as set forth in claim 4 wherein an edge of said polyethylene core layer contains a groove for mounting said structural panel.

9. The multilayer structural panel as set forth in claim 4 wherein mounting slots are formed in said second aluminum layer.

\* \* \* \* \*